(12) United States Patent
Goldstone et al.

(10) Patent No.: US 9,756,503 B2
(45) Date of Patent: Sep. 5, 2017

(54) USER AUTHENTICATION

(71) Applicant: Barclays Bank PLC, London (GB)

(72) Inventors: Jeremy Goldstone, Manchester (GB); Dermot John Dwyer, High Peak (GB)

(73) Assignee: Barclays Bank PLC, London (GB)

( * ) Notice: Subject to any disclaimer, the term of this patent is extended or adjusted under 35 U.S.C. 154(b) by 30 days.

(21) Appl. No.: 14/676,131

(22) Filed: Apr. 1, 2015

(65) Prior Publication Data

US 2016/0007195 A1 Jan. 7, 2016

(30) Foreign Application Priority Data

Apr. 3, 2014 (GB) .................................. 1406041.2

(51) Int. Cl.
| | |
|---|---|
| H04M 1/66 | (2006.01) |
| H04M 3/16 | (2006.01) |
| H04W 12/06 | (2009.01) |
| H04L 29/06 | (2006.01) |
| H04M 3/38 | (2006.01) |
| H04M 3/42 | (2006.01) |
| H04W 88/02 | (2009.01) |
| H04W 92/08 | (2009.01) |
| H04M 3/493 | (2006.01) |

(52) U.S. Cl.
CPC ......... H04W 12/06 (2013.01); H04L 63/0884 (2013.01); H04M 3/387 (2013.01); H04M 3/42059 (2013.01); H04M 3/493 (2013.01); H04W 88/02 (2013.01); H04W 92/08 (2013.01)

(58) Field of Classification Search
CPC .......................... H04M 1/03; H04M 1/725639
USPC .................................................. 455/411, 418
See application file for complete search history.

(56) References Cited

U.S. PATENT DOCUMENTS

| | | | |
|---|---|---|---|
| 5,168,519 A | 12/1992 | Scarinci et al. | |
| 6,148,072 A | 11/2000 | Huang | |
| 2002/0085721 A1* | 7/2002 | Saneto | G06F 21/10 380/277 |
| 2004/0193897 A1 | 9/2004 | Van Volkenburgh | |

(Continued)

FOREIGN PATENT DOCUMENTS

| | | |
|---|---|---|
| CN | 1459756 A | 12/2003 |
| EP | 2334111 A1 | 6/2011 |

(Continued)

*Primary Examiner* — Erika Washington
(74) *Attorney, Agent, or Firm* — Cowan, Liebowitz & Latman, P.C.; Steven D. Underwood (57) ABSTRACT

A method of user authentication by an application (1a) on a mobile telephony device (1) comprises authenticating the user by interaction with the application (1a), communicating with a remote authentication service (4) to receive a call identifier; and sending the call identifier within a telephone call to the remote telephony service (9), by means of which the user is authenticated to the remote telephony service (9). The mobile telephony device may receive a service code linked to the remote telephony service, and the call identifier may be based on this code. The service code may be captured or entered manually into the mobile device, or obtained from an application on the mobile device (1), such as a mobile banking application. The call identifier may be hidden within the call using audio steganography. The authentication service (4) may link the user to a remote service account ID, which is sent to the remote server.

31 Claims, 8 Drawing Sheets

(56) References Cited

U.S. PATENT DOCUMENTS

| | | | |
|---|---|---|---|
| 2004/0237114 A1* | 11/2004 | Drazin | H04N 7/17318 |
| | | | 725/105 |
| 2005/0154913 A1 | 7/2005 | Barriga et al. | |
| 2006/0268842 A1* | 11/2006 | Takahashi | H04L 29/1216 |
| | | | 370/352 |
| 2007/0005403 A1* | 1/2007 | Kennedy | G06F 19/328 |
| | | | 705/4 |
| 2008/0013712 A1 | 1/2008 | Gopinath | |
| 2008/0144787 A1 | 6/2008 | Gantman et al. | |
| 2009/0298465 A1* | 12/2009 | Choi | G06Q 10/107 |
| | | | 455/406 |
| 2010/0198730 A1 | 8/2010 | Ahmed et al. | |
| 2011/0289573 A1* | 11/2011 | Seidl | H04L 63/0815 |
| | | | 726/7 |
| 2012/0077468 A1* | 3/2012 | Fan | G07C 9/00309 |
| | | | 455/414.1 |
| 2012/0284195 A1* | 11/2012 | McMillen | G06Q 20/3223 |
| | | | 705/71 |
| 2013/0048714 A1* | 2/2013 | Sharma | G06Q 20/346 |
| | | | 235/379 |
| 2013/0077773 A1 | 3/2013 | Clark | |
| 2013/0104212 A1* | 4/2013 | Nandakumar | H04L 9/321 |
| | | | 726/7 |

FOREIGN PATENT DOCUMENTS

| | | |
|---|---|---|
| EP | 2611096 A1 | 7/2013 |
| GB | 2495474 A | 4/2013 |
| GB | 2498566 A | 7/2013 |
| WO | 2010019348 A2 | 2/2010 |
| WO | 2013050738 A2 | 4/2013 |

* cited by examiner

USER AUTHENTICATION

CROSS-REFERENCE TO RELATED APPLICATIONS

This application claims priority to GB Patent Application No. 1406041.2, filed Apr. 3, 2014. The entire contents of that application are incorporated herein by reference.

FIELD OF THE INVENTION

This invention relates to methods and systems for user authentication in a telephony service.

BACKGROUND OF THE INVENTION

User authentication is required in order to provide secure user access to a telephony service. However, current user authentication processes can be frustrating for the user; for example, a user requesting a service over the telephone may be required to respond to numerous requests for passcodes or personal data. These requests may be repeated when a user is passed to another operator during a call. The user may find passcodes difficult to remember, yet these passcodes are easy to intercept. Moreover, personal data for the user may be easily obtainable from various public sources.

SUMMARY OF THE INVENTION

Aspects of the invention are defined in the independent claims.

There may be provided a mobile device, an authentication service, and associated computer programs arranged to carry out any of the above methods. In particular the authentication service, an application on the mobile device and an application at the remote or local service as appropriate, which enable one or more of the above methods, are believed to be novel and inventive.

BRIEF DESCRIPTION OF THE DRAWINGS

There now follows, by way of example only, a detailed description of embodiments of the present invention, with reference to the figures identified below.

DETAILED DESCRIPTION OF EMBODIMENTS OF THE INVENTION

Technical Architecture

Figure 1:
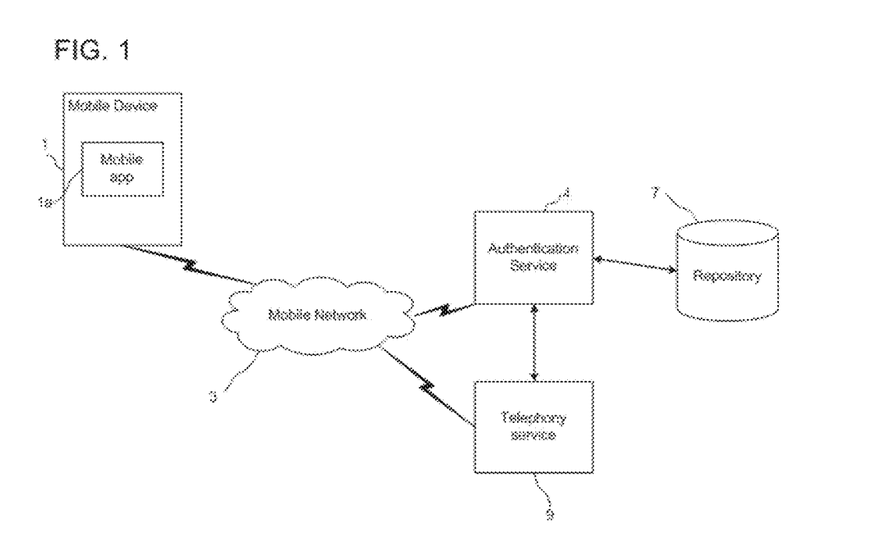
FIG. 1 is a block diagram showing the main components of a mobile user authentication system according to embodiments of the invention.

Referring to FIG. 1, a mobile authentication system according to an embodiment of the invention comprises a wireless or mobile device 1 communicating over a wireless or mobile network 3 with an authentication service 4 by means of a mobile application 1a. The mobile device 1 is of a type that is known per se, such as an iOS™, Blackberry™ or Android™ based smartphone. In some embodiments, the mobile device need not have a voice telephony function. The network 3 may comprise a terrestrial cellular network such as a 2G, 3G or 4G network, a private or public wireless network such as a WiFi™-based network and/or a mobile satellite network. It will be appreciated that a plurality of, and preferably a large number of mobile devices 1 are operable concurrently within the system.

The authentication service 4 also manages a repository 7, such as a database, including identification (ID) and registration data and status information of individual authentication sessions. The mobile application 1a is preferably registered with the authentication service 4 during setup of the mobile application 1a on the mobile device 1.

Registration may involve setting up one or more cryptographic keys for secure communication between the mobile application 1a and the authentication service 4. The key(s) may be generated from a passcode entered by the user during setup. The passcode may be a PIN, graphical passcode and/or biometric data such as a fingerprint or iris scan. The passcode may be modified by the user after setup.

Registration may also include recording the ID data in the repository 7. The ID data may pertain to the mobile device 1, the mobile application 1a and/or the user. Preferably, the ID data is associated with the mobile application 1a, but includes user data entered during provisioning.

In the specific embodiments described below, the user is required to enter the passcode as part of an authentication process. The passcode may be entered as a numeric or alphanumeric input, a graphical input such as a signature or gesture, or a biometric input. Preferably, the passcode is validated remotely, for example by generating a cryptographic key from the passcode, which key is used to sign a message sent to the authentication service 4. The authentication service 4 only responds as described in the embodiments below if the signature is validated. If not, the authentication service 4 may prompt the mobile application 1a to request the passcode again. The authentication service 4 may block access by the mobile application 1a if it presents an invalid signature more than a predetermined number of times. In this way, the authentication process is made resistant to 'brute force' attacks.

Alternatively the passcode may be validated locally against a passcode stored in a local secure area of the mobile device 1. If the passcode is validated, then the mobile application 1a is enabled to operate, for example as described in the specific embodiments below. This enablement may include access to locally stored cryptographic key(s) for secure communication with the authentication service 4.

By the above methods, the identity of the user accessing the mobile application 1a may be strongly authenticated.

In embodiments of the invention, the authentication service 4 communicates with a remote system or service 9, which may be a telephony service accessible from the mobile application 1*a*. Communications between the authentication service 4 and the remote service 9 are preferably performed over one or more secure networks and/or connections. The authentication service 4 may act as an authentication service to a plurality of different remote services 9 and/or mobile applications 1*a*, as will be described below.

FIRST EMBODIMENT

Authentication in Voice Call

Figure 2:
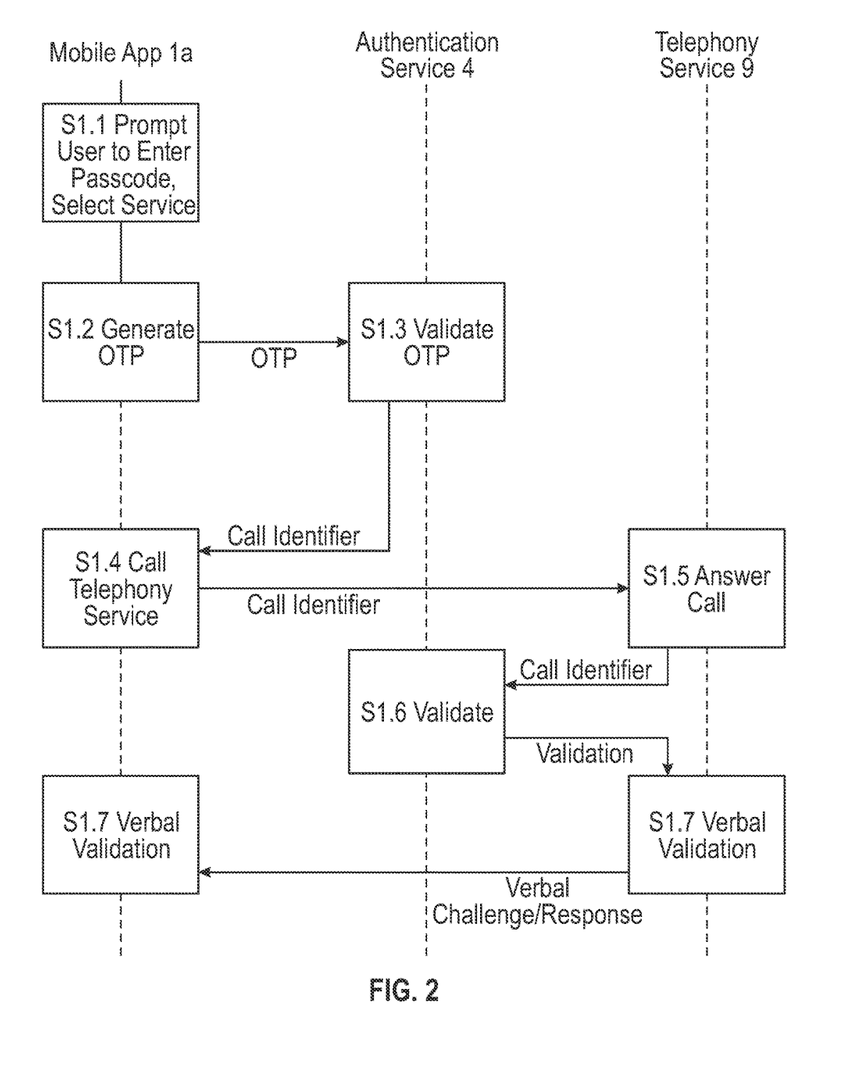
FIG. 2 is a diagram of a method of user authentication in a first embodiment of the invention.

FIG. 2 is a diagram of a user authentication process in a first embodiment, in which the user makes a voice call to a remote service 9, such as a telephony service, using the mobile application 1*a*, with the authentication service 4 acting as an intermediary for authentication purposes.

Figure 2A:
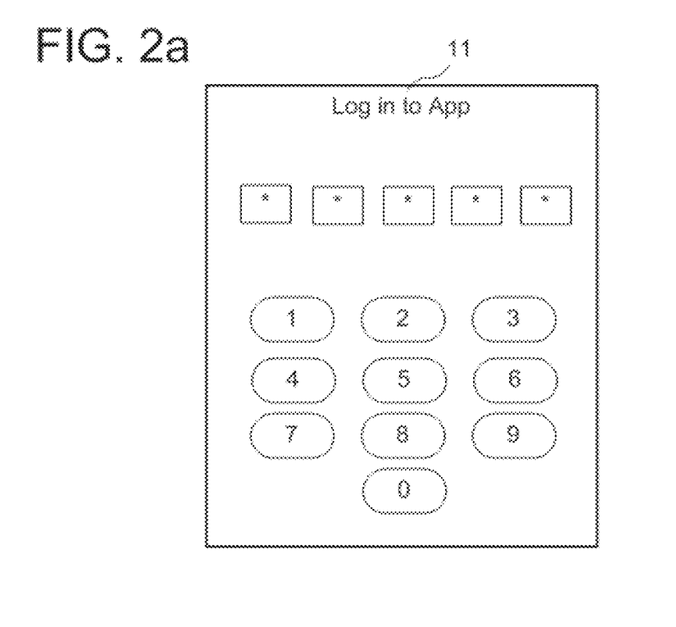
FIGS. 2a and 2b are schematic screenshots of the mobile device display, respectively during login and call type selection.

The user is first required to enter the passcode (S1.1), as described above. FIG. 2*a* shows an example of a suitable login display generated by the mobile application 1*a*.

Figure 2B:
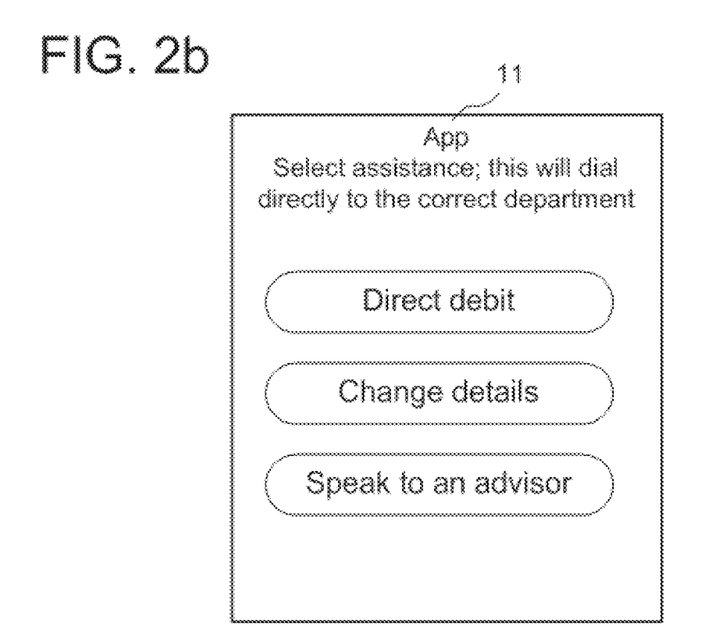

The user may then select a service within the mobile application 1*a* that involves an inbound voice call to the remote service 9. Optionally, the user may make a selection and/or input data relating to the purpose of the voice call. For example, as shown in FIG. 2*b*, the user may be presented with a menu of the purpose of the call, such as setting up or changing a direct debit instruction, changing customer details, or speaking to an advisor for some other purpose.

The mobile application 1*a* generates a one-time passcode (OTP) (S1.2) which is sent to the authentication service 4, where the OTP is validated (S1.3) and a call identifier is sent to the mobile device 1. The call identifier is variable and specific to the intended call, and may be a unique session identifier generated by the authentication service 4, or may comprise the OTP and ID data. The OTP and/or call identifier may be recorded against the ID data in the repository 7, for example for auditing purposes. Instead of the OTP, any other suitable authentication method could be used.

In response to receipt of the call identifier, the mobile application 1*a* initiates a voice call to the remote service 9 and, when the call has been connected to the remote service 9, passes the call identifier to the remote service 9 within the voice call. The call identifier may be encoded as an audio signal, such as DTMF (dual tone multi frequency) tones or synthesized voice, or embedded within the call so that the user is able to speak while the call identifier is being transferred. Preferably, the call identifier is a relatively short code that can be encoded in a short period of DTMF tones or voice synthesis. Alternatively, where the voice call is a Voice over IP (VoIP) call, the call identifier may be passed as non-audio data within the VoIP session.

The ID data may be included with the call identifier. Alternatively or additionally, the remote service 9 may record the Caller ID or CLI, which carries the number of the calling party, as ID data.

The remote service 9 receives the call (S1.5) and forwards the call identifier to the authentication service 4. Preferably, the call is answered automatically by an interactive voice response (IVR) system that is able to decode and forward the call identifier and the caller ID.

The authentication service 4 then validates (S1.6) the call identifier against the record previously received at step S1.3, for example by comparison with a record set up in the repository 7. If validation is successful, then the authentication service 4 sends a validation signal to the remote service 9.

In response to receipt of the validation signal, the remote service 9 connects the mobile device 1 to a telephone operator at the remote service 9. The telephone operator may comprise a human operator and/or an IVR instance.

Optionally, information relating to the purpose of the call, as described above, may be passed to the remote service 9; this information may be included in the OTP and call identifier, or may be sent separately to the remote service 9 at step S1.4. The remote service 9 may route the call to a selected telephone operator based on the information relating to the purpose of the call. Alternatively, at step S1.4, the mobile application 1*a* may call a number dependent on the purpose of the call, for example as selected from the menu shown in FIG. 2*b*.

Preferably, the telephone operator performs a short verbal validation (S1.7) with the user of the mobile device 1, for example by confirming customer data relating to the user, before proceeding with the call. The customer data may be obtained from the authentication service 4, or within the remote service 9, and presented to the telephone operator. This verbal validation may be much shorter than the conventional type of verbal validation, since the user has already been authenticated by the process described above. The verbal validation is optional, and may be omitted. The customer data may also be used by the telephone operator to assist in handling the user's query.

Figure 2C:
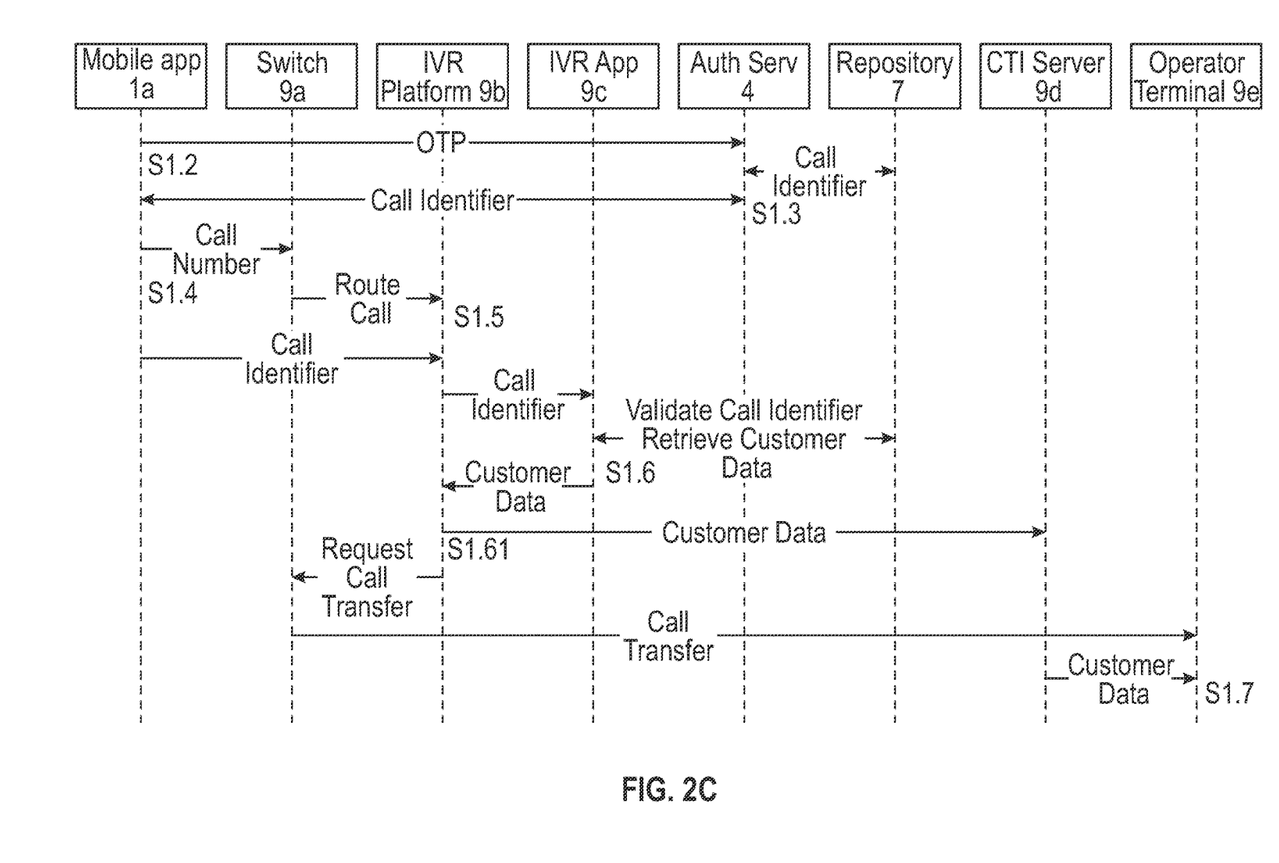
FIG. 2c is a sequence diagram of a more detailed version of the first embodiment.

FIG. 2*c* shows a more detailed sequence diagram of a variant of the first embodiment. In this diagram, the remote service 9 is subdivided into a telephone switch 9*a* or ACD (automatic call distributor), an IVR platform 9*b*, an IVR application 9*c* running on the IVR platform 9*b*, a CTI (computer telephony integration) server 9*d*, and an operator terminal 9*e*. The repository 7 is shown as a separate entity, connected to the authentication service 4. To avoid repetition of the description of the first embodiment, the same reference numerals and terms are used to indicate the same entities and steps. However, the following specific features of this variant are highlighted below.

The switch 9*a* routes the call to the IVR platform 9*b* at step S1.4 and rerouting the call from the IVR platform 9*b* to the operator terminal 9*e* after step S1.6.

The repository 7 is used to validate the OTP against customer records and to generate and store the call identifier at step S1.3. The customer data is retrieved from the repository 7 at step S1.6 and passed via the IVR platform 9*b* and the CTI server 9*d* to the operator terminal 9*e* before step S1.7.

Subsequent to step 1.7, the remote service 9 may transfer the user to another telephone operator within the call while preserving the authentication state and user identity, without requiring the user to re-authenticate. However, in some circumstances such as to confirm instructions for a transaction, it may be preferable to require the user to re-authenticate during a call, to generate a new call identifier. This may be done by sending a prompt message from the remote service 9 to the mobile application 1*a*, or the operator requesting the user to select a function in the mobile application 1*a*. The mobile application 1*a* then initiates generation and sending of a new call identifier, for example as in steps S1.1 to S1.6 above, but without clearing the current call.

In an alternative to the above embodiments, the remote service 9 may initiate an outbound call to the mobile device 1, and the user of the mobile device 1 may be requested to launch the mobile application 1a in order to authenticate themselves. The authentication method proceeds as in the above embodiments, except that the telephone call is set up by the remote service before the authentication process is initiated. The call identifier is sent by the mobile application 1a to the remote service 9 within the call. Additionally, the mobile application 1a may send one or more codes to the remote service 9 within the call, to identify the authentication state, such as whether the mobile application 1a is awaiting the call identifier. This alternative is advantageous where the remote service wishes to contact a customer and ensure they are speaking to the right customer, for example in a fraud incident call. In another variant, the remote service 9 may be required to send the call identifier to the mobile application 1a rather than vice versa, and the mobile application 1a authenticates the remote service 9 by comparing the call identifier received from the remote service 9 with the call identifier received from the authentication service 4.

Specific examples of methods of passing the call identifier from the mobile application 1a to the remote service 9 will now be described. In the DTMF example, the DTMF codes may be included in the dialling string used to initiate the call at step S1.4. The dialling string may include one or more pauses to allow time for the remote service 9 to answer the call before receiving the call identifier. The use of codes included within the dialling string is advantageous in environments where the mobile application 1a is prevented from interacting with a call, after call initiation.

In the voice synthesis example, the mobile application 1a waits for the call to be answered at step S1.5 before outputting the voice synthesis of the call identifier. This example is suitable for environments where interaction with initiated voice calls is permitted. Preferably, the audio is muted to the user during output of the voice synthesis of the call identifier.

In the VoIP example, the call identifier may be passed to the remote service 9 within the VoIP protocol, before the voice call is initiated. This example is generally compatible with VoIP applications.

Alternatively, the call identifier may be hidden within an audio signal that is output by the mobile application 1a within the call, after the call is answered at step 1.5. The call identifier may be hidden by audio steganography, such as spread spectrum encoding. The spread spectrum audio signal may be encoded with a spreading code that is passed to the mobile application 1a with the call identifier, or the call identifier itself may be used to generate the spreading code. Other audio steganographic methods may be used, depending on the properties of the audio signal, such as the bandwidth and whether the audio signal is analog or digital.

Hence, the call identifier is hidden within the audio signal of the call, which provides greater security in case the call is intercepted. The call identifier is substantially imperceptible to the caller, being heard for example as low level noise or a small deterioration in call quality, which is less intrusive than DTMF tones or voice synthesis. Therefore, the audio feedback to the caller need not be muted while the call identifier is transmitted.

Alternatively, or additionally, the mobile application 1a may be used to transfer information or instructions to the remote service 9 within the call, using similar encoding to that used for the call identifier. For example, mobile application 1a may be used to provide payment instructions to the remote service 9 during the call, as an alternative to requiring the caller to read out credit card details. The payment instructions may be hidden within the audio signal, so that they are less vulnerable to interception.

SECOND EMBODIMENT

Linked Accounts

A second embodiment differs from the first embodiment in that the authentication service 4 acts as a caller authentication service for operators of remote services 9. To do this, the remote service 9 must be enrolled with the authentication service 4, for example by registering, in the repository 7, an identity of the remote service operator, one or more cryptographic keys for secure communication between the authentication service 4 and the remote service 9.

In one example of use of the second embodiment, the caller has a first account ID with the operator of the authentication service 4 (e.g. a bank) and a second account ID with the operator of the remote service 9 (e.g. a utility or other service company). The first and second account IDs are linked, for example in a table accessible to the authentication service 4, so that the remote service 9 can identify the caller. Preferably, the authentication service 4 does not communicate the first account ID to the remote service 9, for greater security. However as an alternative, the remote service 9 may link the first and second account IDs based on the first account ID provided by the authentication service 4.

In step S1.6 of the authentication process shown in FIG. 2, the remote service 9 requests a second account ID from the authentication service 4, and the authentication service 4 looks up the second account ID linked to the first account ID, which is itself linked to the call identifier. The authentication service 4 then sends the second account ID with the validation result to the remote service 9. Optionally, the authentication service 4 may also send information relating to the caller, obtained for example from the repository 7.

Figure 3:
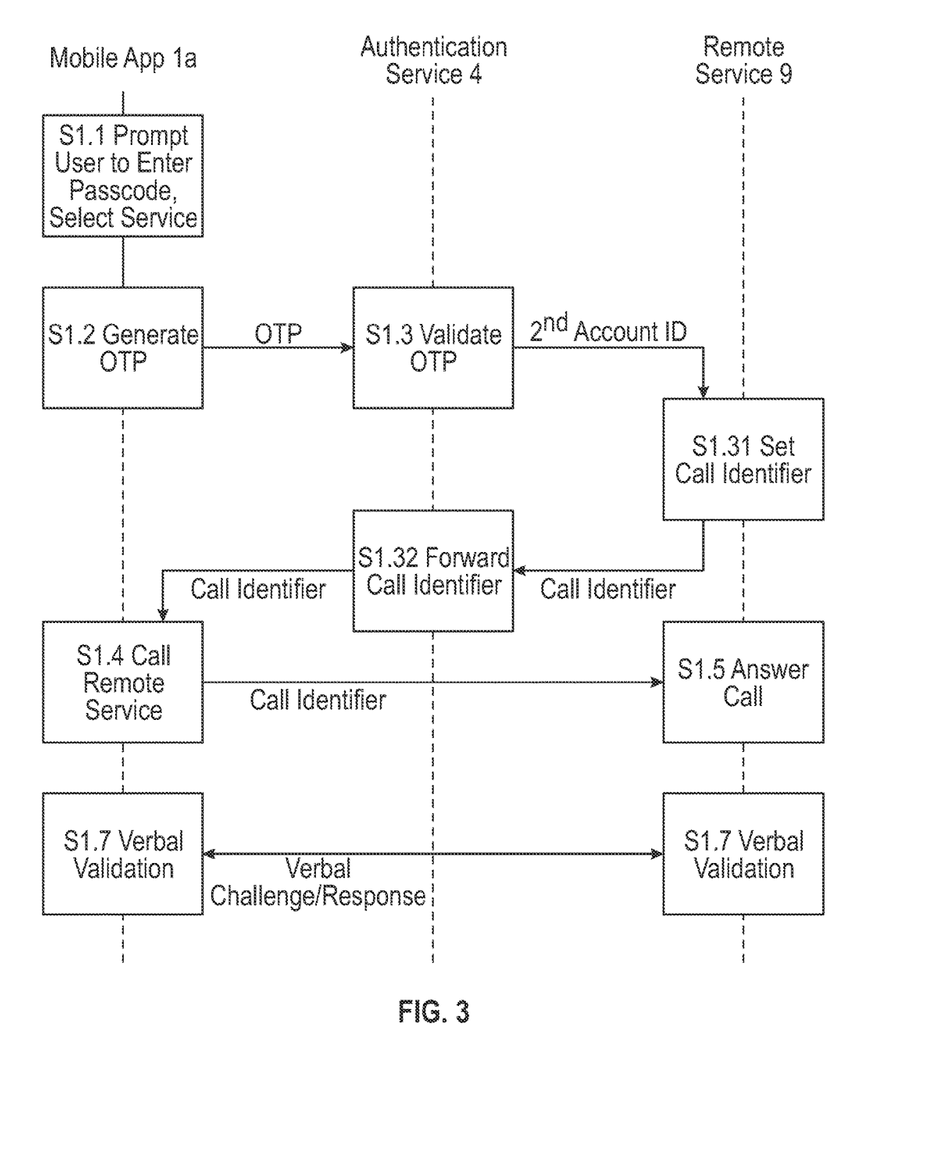
FIG. 3 is a diagram of a method of user authentication in a second embodiment of the invention.

A second example of use of the second embodiment, shown in FIG. 3, is a variant of the first embodiment shown in FIG. 2, and similar steps are indicated using the same reference numerals. The mobile application 1a, when sending the OTP to the authentication service 4, also indicates the remote service 9 to be called. After validating the OTP at step S1.3, the authentication service 4 sends the linked second account ID of the caller to the indicated remote service 9, which then establishes a call identifier at step S1.31. The remote service 9 sends the call identifier to the authentication service 4, which forwards the call identifier to the mobile application 1a. The mobile application 1a then calls the remote service 9 at step 1.4, and sends the call identifier within the call as in the first embodiment. However, the remote service 9 does not need to communicate with the authentication service 4 to validate the call identifier, because the call identifier was set by the remote service at step S1.31. Instead, the remote service 9 validates the call identifier itself, after answering the call at step S1.5.

Call Initiation

A call from the mobile application 1a to a selected remote service 9 may be initiated by one or more different means, as described below. In one example, the mobile application 1a may include, or have access to, a directory of registered remote services 9 and the user selects the desired remote service 9 from the directory when initiating a call. This function may be integrated with a phone book or address book and associated telephony application on the mobile device 1, so that when the user selects a contact to call from the mobile device, the mobile application 1a detects whether the selected contact corresponds to a registered remote service 9 and if so, initiates an authentication process according to one of the embodiments described above, instead of a normal unauthenticated call. If the authentication process is selected, the user may be prompted to enter the passcode as in step 1.1 to ensure strong user authentication, in contrast to a normal call in which no user authentication is required save the passcode needed to access the mobile device 1 as a whole.

In another example of call initiation, a service code corresponding to the remote service 9, and optionally details of the service required, may be entered to the mobile application 1*a*. The service code may be entered manually by the user, or may be captured for example by scanning a machine readable image code, such as a QR code, using an image capture device or camera of the mobile device 1. The service code may be disseminated on printed, broadcast or online materials, such as advertisements, invoices, bank statements and the like. During call initiation, the mobile application 1*a* may send the service code to the authentication service 4, and the call identifier is generated based on the service code. For example, the authentication service 4 or the remote service 9 may look up a telephone number based on the service code, and the authentication service 4 may send the telephone number to the mobile application 1*a* with the call identifier. In the case where the service code indicates details of the service required, these details are passed to the remote service 9, for example within the call identifier. The service code may include payment details or other instructions, which may be used to confirm payment during a call.

Figure 4A:
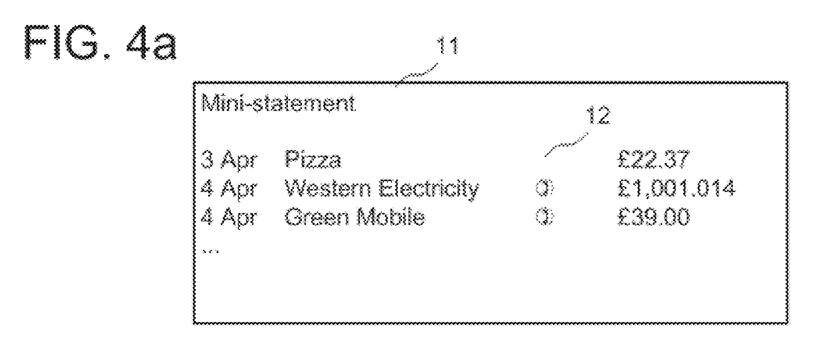
FIGS. 4a and 4b are schematic screenshots of mobile applications including user authentication according to an embodiment of the invention.

In another example, the mobile application 1*a* may have additional functionality, linked to the caller authentication functions described above. For example, the mobile application 1*a* may comprise a mobile banking application with the ability to retrieve and display transaction details, such as a bank statement as shown in FIG. 4. On transactions where the payee is linked to a registered remote service 9, such as 'Western Electricity' or 'Green Mobile', the banking application displays a 'phone' icon 12 or other indicia indicating that an authenticated call may be initiated to the linked remote service 9, initiated for example by clicking the icon. When an authenticated call is initiated in this way, details of the transaction from which the call was initiated are passed to the remote service, for example by means of the call identifier. This example provides a very intuitive way for the caller to initiate the call, as an operator at the remote service will know the nature of the call without the caller having to provide details verbally during the call.

Figure 4B:
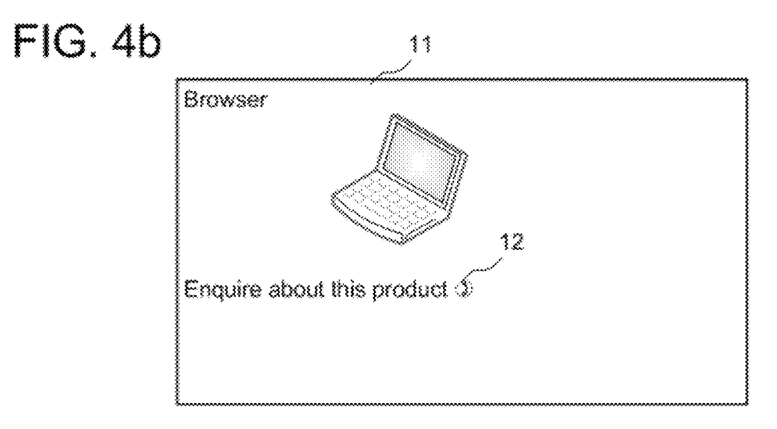

In another example, as illustrated in FIG. 4*b*, the mobile application 1*a* may comprise a browser having an integrated or plug-in caller authentication functionality. A web page may include a service code which causes the 'phone' icon 12 or other indicia to be displayed, so that an authenticated call may be initiated by clicking on the icon 12. The service code may include details of the service required, as in the examples above.

Mobile Device Details

Figure 5:
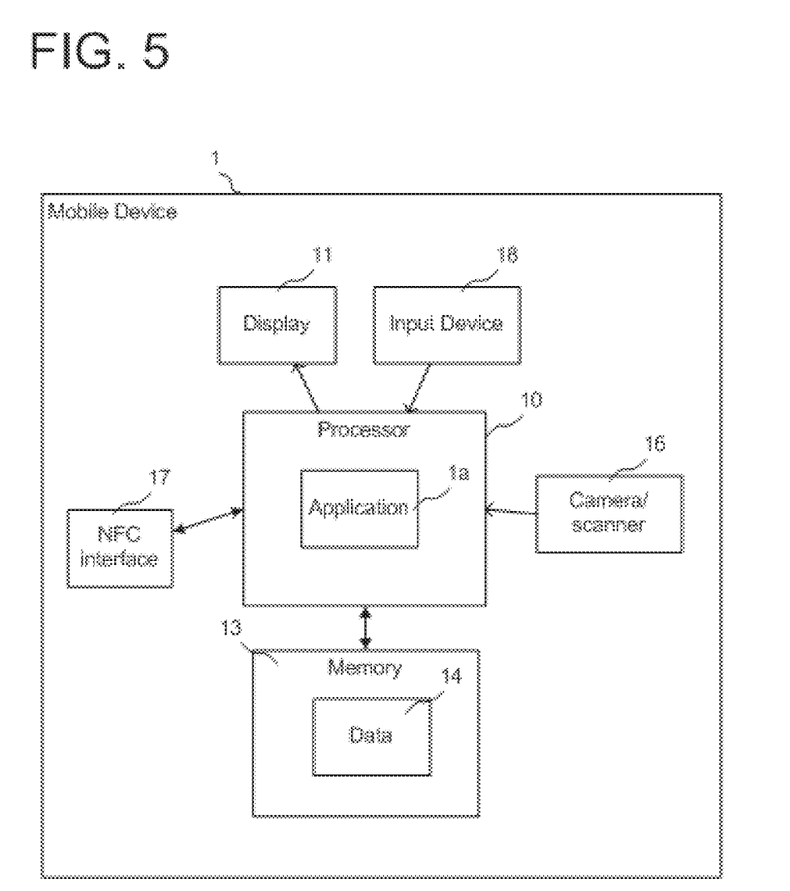
FIG. 5 is a diagram showing details of a mobile device for use in embodiments of the invention.

FIG. 5 shows further details of one example of the mobile device 1, comprising at least a processor 10, including for example hardware and an application platform, running the application 1*a*, and connected to memory 13 storing local data 14. The application platform may be a mobile operating system such as iOS™ Android™ or Blackberry OS. The application 1*a* may comprise program code, which can be loaded or downloaded onto the mobile device 1.

The mobile device 1 has a display 11 and a manual input device 18, which may be integrated with the display as a touchscreen, and/or provided as a keypad. An alternative or additional input device may be used, such as a trackball, trackpad, motion sensor or mouse. The mobile device 1 may include a camera or scanner 16 for capturing optical images and/or codes.

The mobile device 1 includes a network interface 15 to the wireless or mobile network 3. The mobile device 1 may also include an NFC interface 17.

Computer Details

Figure 6:
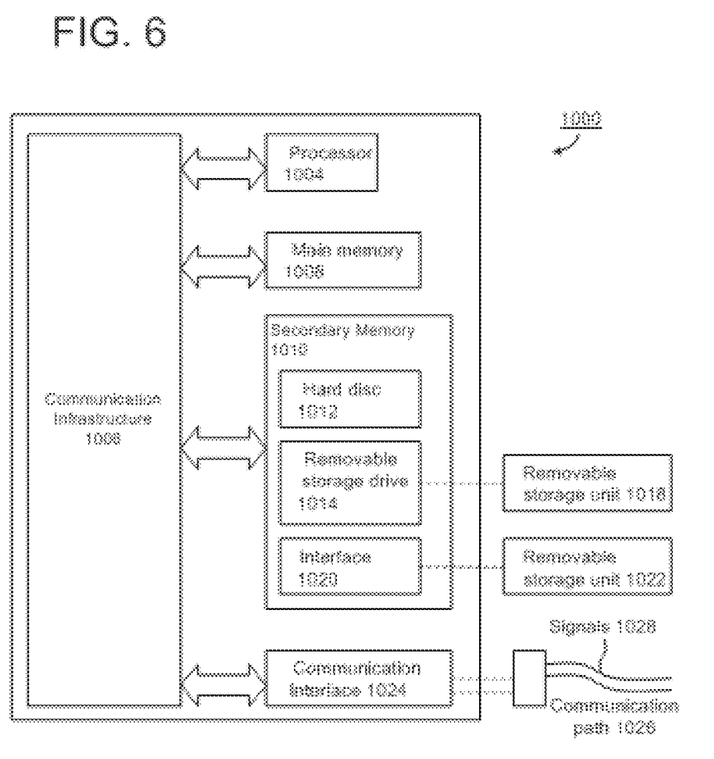
FIG. 6 is a diagram showing details of a computer system for use in embodiments of the invention.

The authentication service 4, local service 8 and/or remote service 9 herein may be implemented by computer systems such as computer system 1000 as shown in FIG. 6. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

Embodiments of the invention are not limited to banking or financial applications, but relate in general to the technical field of electronic communication between computer entities, with an authentication function.

In the above embodiments, the authentication service 4 acts as an authentication server or service separate from the remote or local service 8, 9. Alternatively, some or all of the functions of the authentication service 4 may be integrated with the remote or local service 8, 9.

The above embodiments are described by way of example, and alternative embodiments which may become apparent to the skilled person on reading the above description may nevertheless fall within the scope of the claims.

The invention claimed is:

1. A method of user authentication by an application on a mobile telephony device, the method comprising:
   i. authenticating the user by interaction with the application,
   ii. receiving a service code identifying a remote telephony service,
   iii. communicating with a remote authentication service to receive a call identifier based on the service code; and
   iv. sending the call identifier within a voice telephone call to the remote telephony service, by means of which the user is authenticated to the remote telephony service.

2. The method of claim 1, including receiving from the remote authentication service a telephone number of the remote telephony service, which telephone number is used to initiate the voice telephone call to the remote telephony service.

3. The method of claim 1, wherein the service code includes service information, which is included in the call identifier sent within the voice telephone call to the remote telephony service.

4. The method of claim 1, wherein the remote authentication service communicates the call identifier to the remote telephony service.

5. The method of claim 1, wherein the remote authentication service requests the call identifier from the remote telephony service.

6. The method of claim 1, wherein the service code is received by local input to the mobile telephony device.

7. The method of claim 6, wherein the service code is received by capturing a machine readable code by means of the mobile telephony device.

8. The method of claim 6, wherein the service code is received by user input.

9. The method of claim 1, wherein the service code is obtained from an application on the mobile device.

10. The method of claim 9, wherein the application comprises a mobile banking application, and the service code is linked to the remote telephony service of a payee identified via the mobile banking application.

11. The method of claim 10, wherein the service code is linked to a transaction identified via the mobile banking application.

12. The method of claim 9, wherein the application comprises a browser and the service code is linked to a service indicated in the browser.

13. A non-transitory computer program including program code means arranged to perform the method of claim 1, when executed by a suitably arranged processor or processors.

14. A computer program product comprising the non-transitory computer program of claim 13.

15. Apparatus arranged to perform the method of claim 1.

16. A method of user authentication by an application on a mobile telephony device, the method comprising:
   i. authenticating the user by interaction with the application,
   ii. communicating with a remote authentication service to receive a call identifier;
   iii. sending the call identifier within a voice telephone call with the remote telephony service, by means of which the user is authenticated to the remote telephony service;
   iv. wherein the remote authentication service links an identity of the user to a user identity code of the remote telephony service, and provides the user identity code to the remote telephony service.

17. The method of claim 16, wherein the remote telephony service is pre-registered with the authentication service.

18. A non-transitory computer program including program code means arranged to perform the method of claim 16, when executed by a suitably arranged processor or processors.

19. A computer program product comprising the non-transitory computer program of claim 18.

20. A method of user authentication by an application on a mobile telephony device, the method comprising:
   i. authenticating the user by interaction with the application, ii. communicating with a remote authentication service to receive a call identifier;

iii. sending the call identifier within a voice telephone call with the remote telephony service, by means of which the user is authenticated to the remote telephony service;

wherein the call identifier is hidden within the voice telephone call by audio steganography.

21. The method of claim 20, wherein additional information is sent by the application to the remote telephony service within the voice telephone call, the additional information being hidden by audio steganography.

22. The method of claim 21, wherein the additional information comprises a payment instruction.

23. The method of claim 20, wherein the audio steganography comprises spread spectrum encoding.

24. The method of claim 20, wherein the application is pre-registered with the authentication service, to generate one or more cryptographic keys for secure communication between the mobile application and the remote authentication service.

25. The method of claim 24, wherein identity data associated with the mobile application is stored by the remote authentication service.

26. The method of claim 24, wherein the one or more cryptographic keys are generated from a passcode entered by the user.

27. A non-transitory computer program including program code means arranged to perform the method of claim 20, when executed by a suitably arranged processor or processors.

28. A computer program product comprising the non-transitory computer program of claim 27.

29. A system for user authentication over a telephony channel, the system comprising:

i. a mobile telephony device having an authentication application;

ii. an authentication service arranged for communication with the authentication application; and iii. a telephony service arranged for telephonic communication with the mobile telephony device;

wherein the application is arranged to authenticate a user, receive a service code, communicate with the authentication service to receive a call identifier based on the service code; and to send the call identifier within a voice telephone call with the telephony service so as to authenticate the user with the remote telephony service.

30. A system for user authentication over a telephony channel, the system comprising:

i. a mobile telephony device having an authentication application;

ii. an authentication service arranged for communication with the authentication application; and iii. a remote telephony service arranged for telephonic communication with the mobile telephony device;

wherein the application is arranged to authenticate a user, communicate with the authentication service to receive a call identifier; and to send the call identifier within a voice telephone call with the remote telephony service so as to authenticate the user with the remote telephony service; and wherein the authentication service is arranged to link an identity of the user to a user identity code of the remote telephony service, and to provide the user identity code to the remote telephony service.

31. A system for user authentication over a telephony channel, the system comprising:

i. a mobile telephony device having an authentication application;

ii. an authentication service arranged for communication with the authentication application; and iii. a remote telephony service arranged for telephonic communication with the mobile telephony device;

wherein the application is arranged to authenticate a user, communicate with the authentication service to receive a call identifier; and to send the call identifier within a voice telephone call with the telephony service so as to authenticate the user with the remote telephony service, the call identifier being hidden within the voice telephone call by audio steganography.

* * * * *